United States Patent
Togashi et al.

(10) Patent No.: US 7,457,099 B2
(45) Date of Patent: Nov. 25, 2008

(54) MULTILAYER CAPACITOR

(75) Inventors: Masaaki Togashi, Tokyo (JP); Takeshi Wada, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 12/007,831

(22) Filed: Jan. 16, 2008

(65) Prior Publication Data
US 2008/0174935 A1 Jul. 24, 2008

(30) Foreign Application Priority Data
Jan. 23, 2007 (JP) .............................. 2007-012769

(51) Int. Cl.
*H01G 4/228* (2006.01)
*H01G 4/005* (2006.01)

(52) U.S. Cl. ..................................... 361/306.3; 361/303

(58) Field of Classification Search .................. 361/303, 361/306.1, 306.3, 309–310
See application file for complete search history.

(56) References Cited

U.S. PATENT DOCUMENTS

| 4,814,940 | A * | 3/1989 | Horstmann et al. .......... 361/309 |
| 6,621,682 | B1 * | 9/2003 | Takakuwa et al. ......... 361/306.3 |
| 7,145,429 | B1 * | 12/2006 | Togashi et al. ............... 336/200 |
| 2005/0146837 | A1 * | 7/2005 | Ritter et al. ............... 361/306.1 |
| 2008/0074825 | A1 * | 3/2008 | Togashi .................... 361/306.3 |

FOREIGN PATENT DOCUMENTS

JP        A-09-148174        6/1997

* cited by examiner

*Primary Examiner*—Eric Thomas
(74) *Attorney, Agent, or Firm*—Oliff & Berridge, PLC

(57) ABSTRACT

A multilayer capacitor has a capacitor element, inner electrodes arranged within the capacitor element, and first terminal electrodes and second terminal electrodes arranged on the capacitor element. The capacitor element has an element part held between the inner electrodes. The first terminal electrodes and second terminal electrodes have electrode parts. When seen in a second direction, the electrode parts are arranged on first and second side faces in any of a plurality of areas holding the element part therebetween in a third direction and not overlapping the element part.

5 Claims, 3 Drawing Sheets

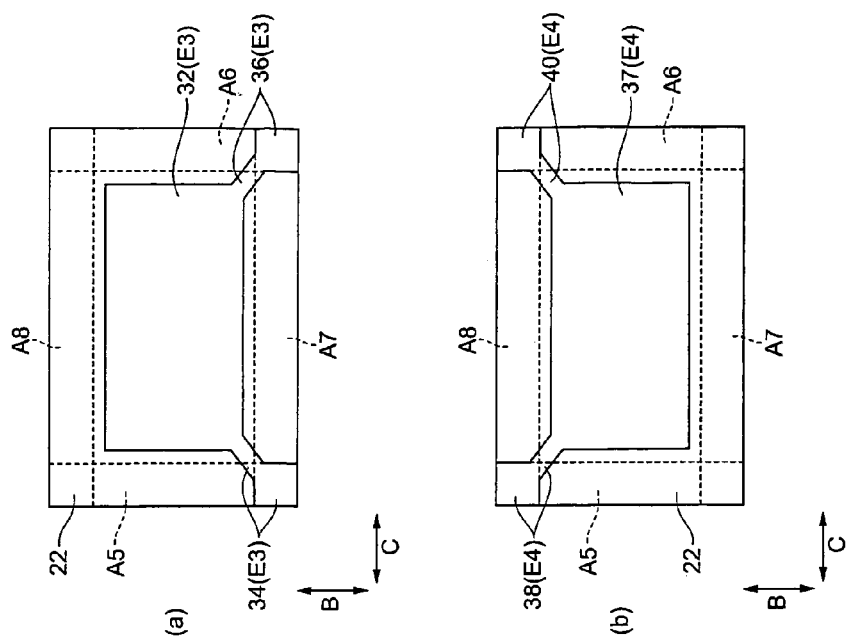
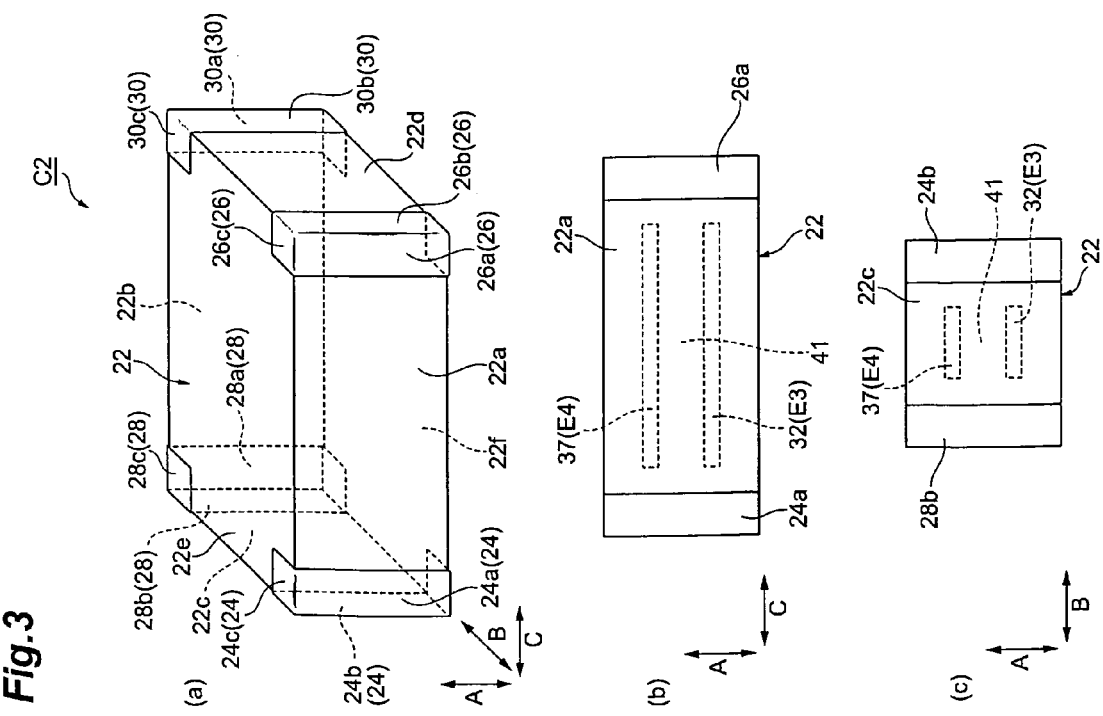

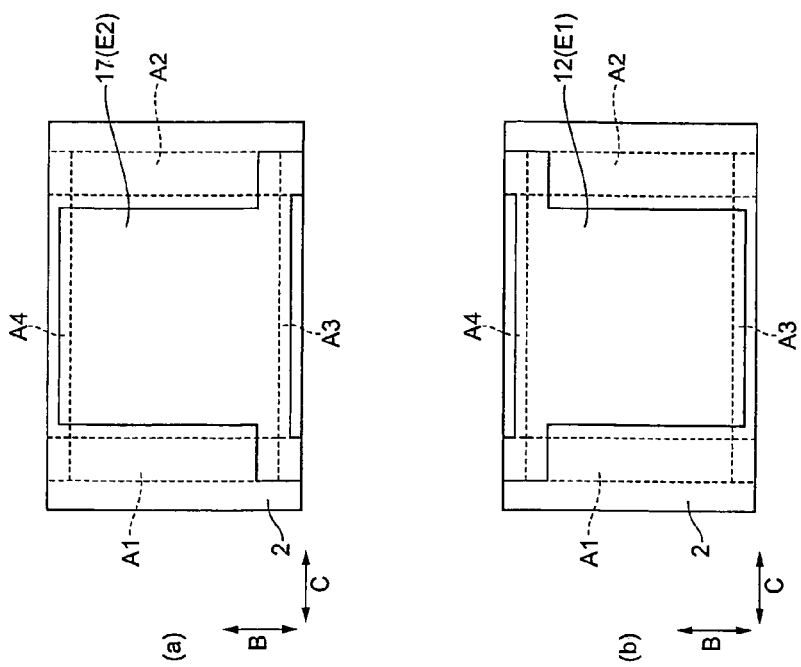
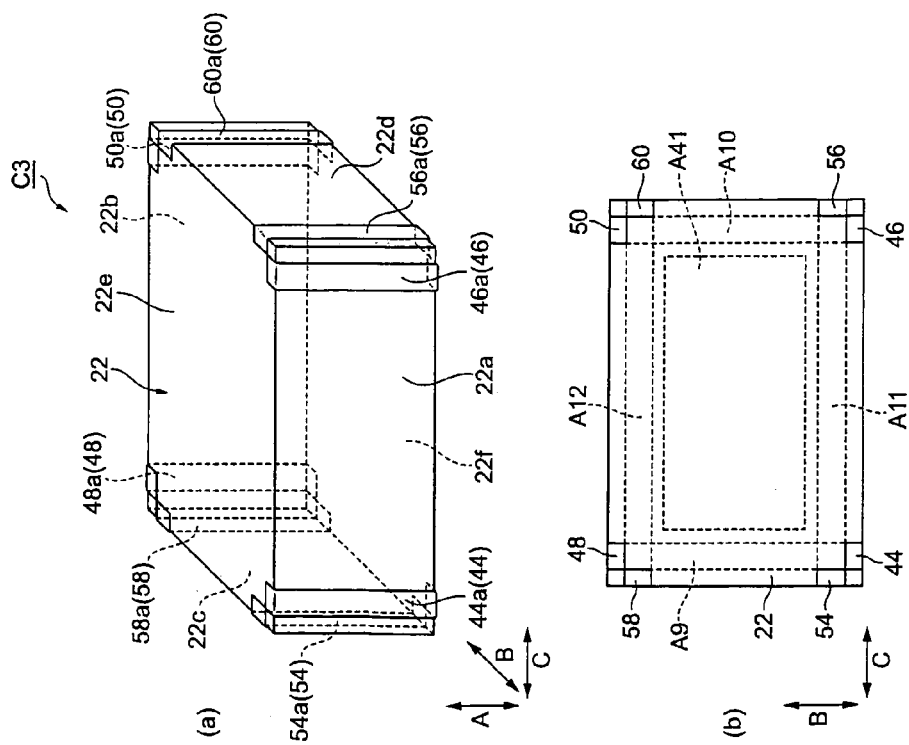

MULTILAYER CAPACITOR

BACKGROUND OF THE INVENTION

1. Field of the Invention

The present invention relates to a multilayer capacitor.

2. Related Background Art

Known as this kind of multilayer capacitor is one comprising an element body made of a dielectric material, a plurality of inner electrodes formed within the element body, and a plurality of terminal electrodes formed on the element body (see, for example, Japanese Patent Application Laid-Open No. 9-148174).

SUMMARY OF THE INVENTION

It is an object of the present invention to provide a multilayer capacitor which can suppress mechanical strains caused by the electrostrictive effect near terminal electrodes in an element body made of a dielectric material.

Meanwhile, when a voltage is applied to a multilayer capacitor equipped with an element body made of a dielectric material, there occurs a problem that a mechanical strain having a magnitude proportional to the applied voltage is caused in the element body because of the electrostrictive effect. When an AC voltage is applied, a vibration occurs in the multilayer capacitor in particular. If such a mechanical strain is generated when the multilayer capacitor is mounted on a board or the like, sounding will occur in the board due to the propagation of vibrations caused by the strain.

The inventors conducted diligent studies about how to reduce the sounding occurring when mounting the multilayer capacitor to boards and the like. As a result, the inventors have found that the sounding occurs at the contact portion between the board or the like to which the multilayer capacitor is mounted and the multilayer capacitor, i.e., the contact portion between a land electrode or the like of the board and a terminal electrode of the multilayer capacitor. The inventors conducted further studies based on this discovery and, as a result, have found a new fact that suppressing the electric field applied to an area in the vicinity of a terminal electrode in the element body can restrain the mechanical strain of the element body caused by the electrostrictive effect from affecting the terminal electrode.

In view of these results of studies, in one aspect, the present invention provides a multilayer capacitor comprising an element body made of a dielectric material, a plurality of inner electrodes arranged within the element body such as to oppose each other at least partly, and a plurality of terminal electrodes arranged on the element body and connected to corresponding inner electrodes in the plurality of inner electrodes; wherein the plurality of terminal electrodes include respective electrode parts arranged in any of a plurality of areas on two side faces opposing each other and being parallel to a first direction in which the plurality of inner electrodes oppose each other in outer surfaces of the element body, the plurality of areas, when seen in a second direction in which the two side faces oppose each other, holding therebetween an element part held between the plurality of inner electrodes in a third direction orthogonal to the first and second directions and being kept from overlapping the element part.

The multilayer capacitor in accordance with this aspect of the present invention comprises an element body having an element part, a plurality of inner electrodes arranged within the element body, and a plurality of terminal electrodes arranged on the element body. Though the element part is a portion held between a plurality of inner electrodes and thus causes the electrostrictive effect, the electrode part of each terminal electrode is arranged in an area not overlapping the element part when seen in the second direction. Such an area is separated from the element part and thus is hard to be affected by the electrostrictive effect occurring in the element part if any. This reduces the influence on the terminal electrodes caused by the electrostrictive effect of the element body, whereby the multilayer capacitor can suppress mechanical strains caused by the electrostrictive effect near the terminal electrodes. In the multilayer capacitor in accordance with the present invention, the electrode parts of the terminal electrodes are arranged in areas holding therebetween the element part in the third direction on the two side faces opposing each other in the second direction. In this case, the area of the terminal electrodes becomes smaller than that in conventional multilayer capacitors in which terminal electrodes are formed such as to cover the side faces as a whole. Therefore, even when the electrode parts of the terminal electrodes are pulled by the element body distorted by the electrostrictive effect, the influence on the board or the like mounting the multilayer capacitor can be reduced.

Preferably, in the multilayer capacitor in accordance with the present invention, the plurality of terminal electrodes further include respective additional electrode parts continuous with the electrode parts and arranged in any of a plurality of areas on two side faces opposing each other in the third direction in the outer surfaces of the element body, the plurality of areas, when seen in the third direction, holding therebetween the element part in the second direction and being kept from overlapping the element part. In this case, two side faces opposing each other in the third direction are also arranged with electrode parts, whereby it becomes further easier to connect the terminal electrodes of the multilayer capacitor to land electrodes of a board. The additional electrode parts of the terminal electrodes are arranged in areas not overlapping the element part when seen in the third direction and thus are hard to be affected by the electrostrictive effect occurring in the element part if any.

Preferably, in the multilayer capacitor in accordance with the present invention, the plurality of terminal electrodes further include respective additional electrode parts continuous with the electrode parts and arranged on a side face orthogonal to the first direction in the outer surfaces of the element body. In this case, the electrode parts are also arranged on the side face orthogonal to the first direction, whereby it becomes easier to connect the terminal electrodes of the multilayer capacitor to the land electrodes of the board.

In another aspect, the present invention provides a multilayer capacitor comprising an element body made of a dielectric material, a plurality of inner electrodes arranged within the element body such as to oppose each other at least partly, and a plurality of terminal electrodes arranged on the element body and connected to corresponding inner electrodes in the plurality of inner electrodes; wherein the plurality of terminal electrodes include respective electrode parts arranged in any of a plurality of first areas on two side faces opposing each other and being parallel to a first direction in which the plurality of inner electrodes oppose each other in outer surfaces of the element body, the plurality of first areas, when seen in a second direction in which the two side faces oppose each other, holding therebetween an element part held between the plurality of inner electrodes in a third direction orthogonal to the first and second directions and being kept from overlapping the element part, and a plurality of second areas on two side faces opposing each other in the third direction in the outer surfaces of the element body, the plurality of second areas, when seen in the third direction, holding therebetween the element part in the second direction and being kept from overlapping the element part.

The multilayer capacitor in accordance with this aspect of the present invention comprises an element body having an element part, a plurality of inner electrodes arranged within the element body, and a plurality of terminal electrodes arranged on the element body. Each terminal electrode includes an electrode part which is arranged on any of two side faces opposing each other in the second direction and two side faces opposing each other in the third direction. On the two side faces opposing each other in the second direction, the electrode parts are arranged in areas not overlapping the element part when seen in the second direction. On the two side faces opposing each other in the third direction, the electrode parts are arranged in areas not overlapping the element part when seen in the third direction. This makes each electrode part remote from the element part, whereby the terminal electrodes are hard to be affected by the electrostrictive effect in the element part if any. This reduces the influence on the terminal electrodes caused by the electrostrictive effect of the element body, whereby the multilayer capacitor can suppress mechanical strains caused by the electrostrictive effect near the terminal electrodes. The multilayer capacitor in accordance with this aspect of the present invention has electrode parts on the two side faces opposing each other in the second direction and two side faces opposing each other in the third direction, whereby it becomes easy to connect the terminal electrodes of the multilayer capacitor to land electrodes of a board.

The present invention can provide a multilayer capacitor which can suppress mechanical strains caused by the electrostrictive effect near terminal electrodes in an element body made of a dielectric material.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 3 is a perspective and side view of the multilayer capacitor in accordance with a second embodiment;

FIG. 4 is a sectional view of the multilayer capacitor in accordance with the second embodiment;

FIG. 5 is a perspective and top plan view of the multilayer capacitor in accordance with a third embodiment; and FIG. 6 is a sectional view of a modified example of the multilayer capacitor in accordance with the first embodiment.

DESCRIPTION OF THE PREFERRED EMBODIMENTS

In the following, preferred embodiments will be explained in detail with reference to the accompanying drawings. In the explanation, the same constituents or those having the same functions will be referred to with the same numerals or letters while omitting their overlapping descriptions.

First Embodiment

Figure 2:
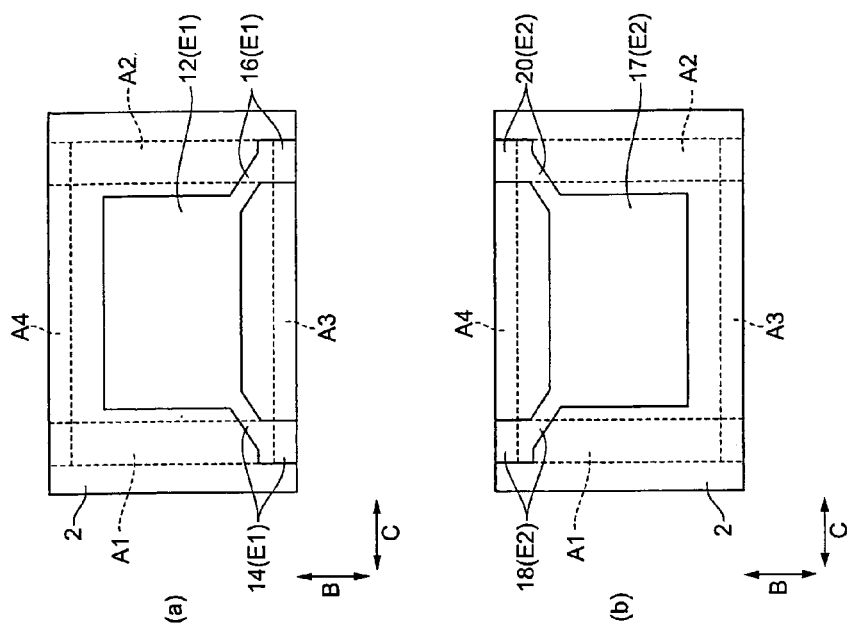
FIG. 2 is a sectional view of the multilayer capacitor in accordance with the first embodiment.
Figure 1:
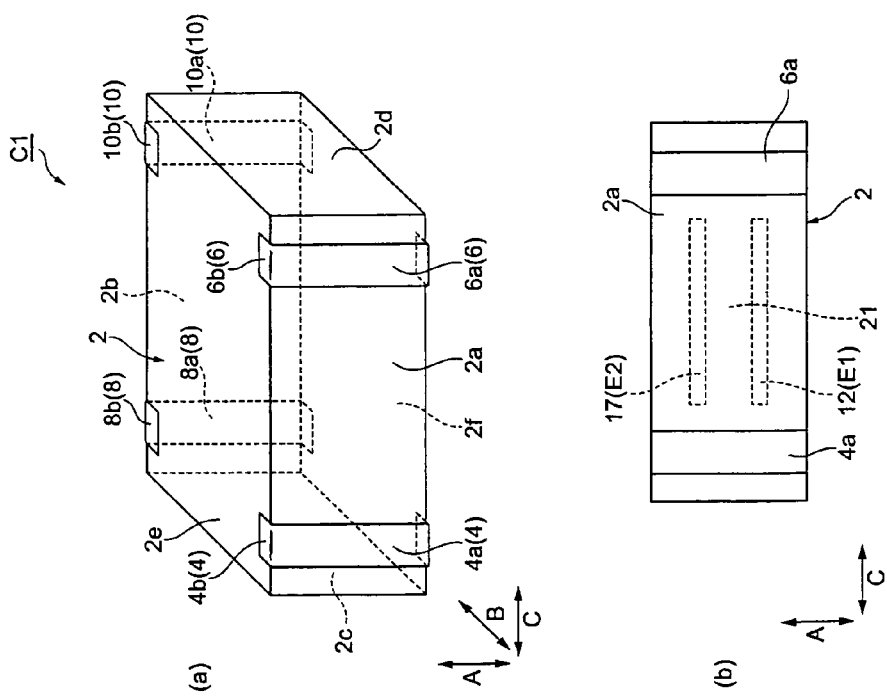
FIG. 1 is a perspective and side view of the multilayer capacitor in accordance with a first embodiment.

With reference to FIGS. 1 and 2, the structure of the multilayer capacitor C1 in accordance with the first embodiment will be explained. FIG. 1 is a view showing the multilayer capacitor in accordance with this embodiment, in which FIGS. 1(a) and 1(b) are perspective and side views, respectively. FIG. 2 is a sectional view of the multilayer capacitor in accordance with this embodiment. The cross-sectional hatching is omitted in FIG. 2.

As shown in FIG. 1, the multilayer capacitor C1 comprises a capacitor element (element body) 2, a plurality of (2 in this embodiment) inner electrodes E1, E2, and a plurality of (4 in this embodiment) first and second terminal electrodes 4, 6, 8, 10.

The capacitor element 2 is made of a dielectric material. The inner electrodes E1, E2 are arranged within the capacitor element 2. More specifically, in the capacitor element 2, the inner electrodes E1, E2 are laminated while holding therebetween a dielectric layer which is not depicted. The undepicted dielectric layer is constituted by a sintered body of a ceramic green sheet containing a dielectric ceramic, for example. The inner electrodes E1, E2 are constituted by sintered bodies of a conductive paste.

The capacitor element 2 has a substantially rectangular parallelepiped form. The capacitor element 2 has a first side face 2a and a second side face 2b which oppose each other while being parallel to an arrowed direction A (first direction). The capacitor element 2 has a third side face 2c and a fourth side face 2d which oppose each other and continue with the first and second side faces 2a, 2b. The third side face 2c and fourth side face 2d are surfaces parallel to the arrowed direction A. The capacitor element 2 has a fifth side face 2e and a sixth side face 2f which oppose each other and continue with the first to fourth side faces 2a to 2d. The fifth side face 2e and sixth side face 2f are surfaces orthogonal to the arrowed direction A. The arrowed direction A indicates the direction in which the inner electrodes E1, E2 oppose each other. An arrowed direction B (second direction) indicates the direction in which the first side face 2a and second side face 2b oppose each other, while an arrowed direction C (third direction) indicates a direction orthogonal to the arrowed directions A and B. Therefore, the third and fourth side faces 2c, 2d can also be said to continue with the first and second side faces 2a, 2b and oppose each other in the arrowed direction C.

As shown in FIG. 2(a), the inner electrode E1 includes a main electrode part 12 and lead electrode parts 14, 16. The main electrode part 12 has a rectangular form and is positioned at substantially the center portion of the capacitor element 2. The lead electrode parts 14, 16 extend from the main electrode part 12 so as to reach the first side face 2a. The lead electrode parts 14, 16 are electrically and physically connected to electrode parts 4a, 6a of the first terminal electrodes 4, 6, respectively.

As shown in FIG. 2(b), the inner electrode E2 includes a main electrode part 17 and lead electrode parts 18, 20. The main electrode part 17 has a rectangular form and is positioned at substantially the center portion of the capacitor element 2. The lead electrode parts 18, 20 extend from the main electrode part 17 so as to reach the second side face 2b. The lead electrode parts 18, 20 are electrically and physically connected to the second terminal electrodes 8, 10, respectively.

The inner electrodes E1, E2 are arranged such that the main electrode part 12 of the inner electrode E1 and the main electrode part 17 of the inner electrode E2 overlay each other when seen in the arrowed direction A. Consequently, as shown in FIG. 1(b), a portion held between the main electrode part 12 of the inner electrode E1 and the main electrode part 17 of the inner electrode E2 exists in the capacitor element 2. This portion will hereinafter be referred to as element part 21.

On the capacitor element 2, the first terminal electrodes 4, 6 are arranged over the first, fifth, and sixth side faces 2a, 2e, 2f. On the capacitor element 2, the second terminal electrodes 8, 10 are arranged over the second, fifth, and sixth side faces 2b, 2e, 2f. The first terminal electrode 4 has electrode parts 4a, 4b, while the first terminal electrode 6 has electrode parts 6a, 6b. The second terminal electrode 8 has electrode parts 8a, 8b, while the second terminal electrode 10 has electrode parts 10a, 10b. The first terminal electrodes 4, 6 and second terminal electrodes 8, 10 are formed, for example, by attaching and burning a conductive paste, which contains a conductive metal powder and a glass frit, onto their corresponding outer surfaces of the capacitor element 2. A plating layer may be formed on the burned electrodes when necessary.

The electrode parts 4a, 6a of the first terminal electrodes 4, 6 are positioned on the first side face 2a. As shown in FIG. 1(b), when seen in the arrowed direction B, the electrode parts 4a, 6a of the first terminal electrodes 4, 6 are arranged on the first side face 2a in any of a plurality of areas holding the element part 21 therebetween in the arrowed direction C and not overlapping the element part 21. In this embodiment, in two areas holding the element part 21 therebetween in the arrowed direction C and not overlapping the element part 21, the electrode part 4a is arranged in the area on the third side face 2c side, while the electrode part 6a is arranged in the area on the fourth side face 2d side.

The electrode parts 8a, 10a of the second terminal electrodes 8, 10 are positioned on the second side face 2b. When seen in the arrowed direction B, in two areas holding the element part 21 therebetween in the arrowed direction C and not overlapping the element part 21, the electrode part 8a is arranged on the second side face 2b in the area on the third side face 2c side. When seen in the arrowed direction B, in the two areas holding the element part 21 therebetween in the arrowed direction C and not overlapping the element part 21, the electrode part 10a is arranged on the second side face 2b in the area on the fourth side face 2d side. The electrode parts 8a, 10a are arranged so as to oppose the electrode parts 4a, 6a of the first terminal electrodes 4, 6, respectively.

The electrode parts 4b, 6b of the first terminal electrodes 4, 6 are continuous with the electrode parts 4a, 6a, respectively. The electrode parts 8b, 10b of the second terminal electrodes 8, 10 are continuous with the electrode parts 8a, 10a, respectively. The electrode parts 4b, 6b, 8b, 10b are arranged on the fifth side face 2e of the capacitor element 2.

As shown in FIG. 2(a), when seen in the arrowed direction A, the capacitor element 2 has an area A1 held between the electrode part 4a of the first terminal electrode 4 and the electrode part 8a of the second terminal electrode 8 and an area A2 held between the electrode part 6a of the first terminal electrode 6 and the electrode part 10a of the second terminal electrode 10. The capacitor element 2 also has an area A3 held between the electrode parts 4b, 6b of the first terminal electrodes 4, 6 and an area A4 held between the electrode parts 8b, 10b of the second terminal electrodes 8, 10. Since the electrode parts 4a, 6a, 8a, 10a are arranged at the positions mentioned above, the areas A1, A2 are located such as to hold therebetween the main electrode parts 12, 17 of the inner electrodes E1, E2 in the arrowed direction C without overlapping the main electrode parts 12, 17. Also, in this embodiment, the areas A3, A4 are located such as to hold therebetween the main electrode parts 12, 17 of the inner electrodes E1, E2 in the arrowed direction B without overlapping the main electrode parts 12, 17.

Operations of thus constructed multilayer capacitor C1 will now be explained. When the first terminal electrodes 4, 6 and second terminal electrodes 8, 10 are connected to land electrodes or the like of a board, and a voltage is applied to the inner electrodes E1, E2 through the first terminal electrodes 4, 6 and second terminal electrodes 8, 10, the electrostrictive effect occurs in the element part 21 held between the main electrode part 12 of the inner electrode E1 and the main electrode part 17 of the inner electrode E2. The electrostrictive effect generated in the element part 21 expands and contracts the main electrode parts 12, 17 of the inner electrodes E1, E2. The area A1 held between the electrode part 4a of the first terminal electrode 4 and the electrode part 8a of the second terminal electrode 8 and the area A2 held between the electrode part 6a of the first terminal electrode 6 and the electrode part 10a of the second terminal electrode 10 do not overlap the main electrode parts 12, 17 and the element part 21. Therefore, mechanical strains of the capacitor element 2 caused by the expansion and contraction of the main electrode parts 12, 17 are alleviated in the areas A1, A2. As a result, the phenomenon that the first terminal electrodes 4, 6 and second terminal electrodes 8, 10 are pulled by mechanical strains of the capacitor element 2 is hard to occur.

Therefore, even when a voltage is applied to the multilayer capacitor C1 mounted to a board or the like, sounding is restrained from occurring in the board or the like.

In the multilayer capacitor C1, the area A3 held between the electrode parts 4b, 6b of the first terminal electrodes 4, 6 and the area A4 held between the electrode parts 8b, 10b of the second terminal electrodes 8, 10 are also kept from overlapping the main electrode parts 12, 17 and the element part 21. Therefore, mechanical strains of the capacitor element 2 caused by the expansion and contraction of the main electrode parts 12, 17 are alleviated not only in the areas A1, A2 but also in the areas A3, A4. As a consequence, the phenomenon that the first terminal electrodes 4, 6 and second terminal electrodes 8, 10 are pulled by mechanical strains of the capacitor element 2 is harder to occur.

In the multilayer capacitor C1, the terminal electrodes are formed in an area narrower than that in the case where they are formed such as to cover the first and second side faces 2a, 2b of the capacitor element 2 as a whole. This can reduce the influence on a board or the like mounting the multilayer capacitor C1 even when the first terminal electrodes 4, 6 and second terminal electrodes 8, 10 are pulled by the capacitor element 2 distorted by the electrostrictive effect.

In the multilayer capacitor C1, the first terminal electrodes 4, 6 and second terminal electrodes 8, 10 have the electrode parts not only on the first and second side faces 2a, 2b but also on the fifth side face 2e. This makes it easy to connect the multilayer capacitor C1 to land electrodes of a board.

Second Embodiment

With reference to FIGS. 3 and 4, the multilayer capacitor in accordance with the second embodiment will be explained.

The multilayer capacitor in accordance with the second embodiment differs from the multilayer capacitor C1 in accordance with the first embodiment in terms of positions of terminal electrodes. FIG. 3 is a view showing the multilayer capacitor in accordance with this embodiment, in which FIG. 3(a) is a perspective view, while FIGS. 3(b) and 3(c) are side views. FIG. 4 is a sectional view of the multilayer capacitor in accordance with this embodiment. The cross-sectional hatching is omitted in FIG. 4.

As shown in FIG. 3, the multilayer capacitor C2 in accordance with the second embodiment comprises a capacitor element 22, inner electrodes E3, E4, first terminal electrodes 24, 26, and second terminal electrodes 28, 30.

In the capacitor element 22, the inner electrodes E3, E4 are laminated while holding therebetween a dielectric layer which is not depicted. The capacitor element 22 has a substantially rectangular parallelepiped form with first to sixth side faces 22a to 22f. The first to sixth side faces 22a to 22f of the capacitor element 22 correspond to the first to sixth side faces 2a to 2f of the capacitor element 2 in accordance with the first embodiment. The inner electrodes E3, E4 and dielectric layer of the capacitor element 22 are made of materials similar to those of the inner electrodes E1, E2 and dielectric layer of the capacitor element 2 in accordance with the first embodiment.

As shown in FIG. 4(a), the inner electrode E3 includes a main electrode part 32 and lead electrode parts 34, 36 extending from the main electrode part 32. The main electrode part 32 has a rectangular form and is positioned at substantially the center portion of the capacitor element 22. The lead electrode part 34 extends from the main electrode part 32. The lead electrode part 34 reaches a ridge where the first and third side faces 22a, 22c meet, so as to be electrically and physically connected to the first terminal electrode 24. The lead electrode part 36 extends from the main electrode part 32. The lead electrode part 36 reaches a ridge where the first and fourth side faces 22a, 22d meet, so as to be electrically and physically connected to the first terminal electrode 26.

As shown in FIG. 4(b), the inner electrode E4 includes a main electrode part 37 and lead electrode parts 38, 40 extending from the main electrode part 37. The main electrode part 37 has a rectangular form and is positioned at substantially the center portion of the capacitor element 22. The lead electrode part 38 extends from the main electrode part 37. The lead electrode part 38 reaches a ridge where the second and third side faces 22b, 22c meet, so as to be electrically and physically connected to the second terminal electrode 28. The lead electrode part 40 extends from the main electrode part 37. The lead electrode part 40 reaches a ridge where the second and fourth side faces 22b, 22d meet, so as to be electrically and physically connected to the second terminal electrode 30.

The inner electrodes E3, E4 are arranged such that the main electrode part 32 of the inner electrode E3 and the main electrode part 37 of the inner electrode E4 overlay each other when seen in the arrowed direction A. Consequently, as shown in FIGS. 3(b) and 3(c), a portion held between the main electrode part 32 of the inner electrode E3 and the main electrode part 37 of the inner electrode E4 exists in the capacitor element 22. This portion will hereinafter be referred to as element part 41.

On the capacitor element 22, the first terminal electrode 24 is arranged over the first, third, fifth, and sixth side faces 2a, 2c, 2e, 2f, while the first terminal electrode 26 is arranged over the first, fourth, fifth, and sixth side faces 2a, 2d, 2e, 2f. On the capacitor element 22, the second terminal electrode 28 is arranged over the second, third, fifth, and sixth side faces 2b, 2c, 2e, 2f, while the second terminal electrode 30 is arranged over the second, fourth, fifth, and sixth side faces 2b, 2d, 2e, 2f. The first terminal electrode 24 has electrode parts 24a, 24b, 24c, while the first terminal electrode 26 has electrode parts 26a, 26b, 26c. The second terminal electrode 28 has electrode parts 28a, 28b, 28c, while the second terminal electrode 30 has electrode parts 30a, 30b, 30c. Materials and methods for forming the first terminal electrodes 24, 26 and second terminal electrodes 28, 30 are similar to those of the first terminal electrodes 4, 6 and second terminal electrodes 8, 10 in accordance with the first embodiment.

The electrode parts 24a, 26a of the first terminal electrodes 24, 26 are positioned on the first side face 22a. As shown in FIG. 3(b), when seen in the arrowed direction B, the electrode parts 24a, 26a of the first terminal electrodes 24, 26 are arranged on the first side face 22a in any of a plurality of areas (first areas) holding the element part 41 therebetween in the arrowed direction C and not overlapping the element part 41. In this embodiment, in two areas holding the element part 41 therebetween in the arrowed direction C and not overlapping the element part 41, the electrode part 24a is arranged in the area on the third side face 22c side, while the electrode part 26a is arranged in the area on the fourth side face 22d side.

The electrode parts 28a, 30a of the first terminal electrodes 28, 30 are positioned on the second side face 22b. When seen in the arrowed direction B, in two areas holding the element part 41 therebetween in the arrowed direction C and not overlapping the element part 41, the electrode part 28a is arranged on the second side face 22b in the area on the third side face 22c side. When seen in the arrowed direction B, in the two areas holding the element part 41 therebetween in the arrowed direction C and not overlapping the element part 41, the electrode part 30a is arranged on the second side face 22b in the area on the fourth side face 22d side. The electrode parts 28a, 30a are arranged so as to oppose the electrode parts 24a, 26a of the first terminal electrodes 24, 26, respectively.

The electrode part 24b of the first terminal electrode 24 is continuous with the electrode part 24a and positioned on the third side face 22c. The electrode part 26b of the first terminal electrode 26 is continuous with the electrode part 26a and positioned on the fourth side face 22d. The electrode part 28b of the second terminal electrode 28 is continuous with the electrode part 28a and positioned on the third side face 22c. The electrode part 30b of the second terminal electrode 30 is continuous with the electrode part 30a and positioned on the fourth side face 22d.

As shown in FIG. 3(c), when seen in the arrowed direction C, the electrode parts 24b, 28b are arranged on the third side face 22c in any of a plurality of areas (second areas) holding the element part 41 therebetween in the arrowed direction B and not overlapping the element part 41. In this embodiment, in two areas holding the element part 41 therebetween in the arrowed direction B and not overlapping the element part 41, the electrode part 24b is arranged in the area on the first side face 22a side, while the electrode part 28b is arranged in the area on the second side face 22b side.

On the fourth side face 22d, the electrode part 26b of the first terminal electrode 26 is arranged so as to oppose the electrode part 24b of the first terminal electrode 24. On the fourth side face 22d, the electrode part 30b of the second terminal electrode 30 is arranged so as to oppose the electrode part 28b of the second terminal electrode 28. When the fourth side face 22d is seen in the arrowed direction C, in two areas holding the element part 41 therebetween in the arrowed direction B and not overlapping the element part 41, the electrode part 26b is arranged in the area on the first side face 22a side, while the electrode part 30b is arranged in the area on the second side face 22b side.

Thus arranged electrode parts 24a, 24b of the first terminal electrode 24 cover the ridge where the first and third side faces 22a, 22c meet. The electrode parts 26a, 26b of the first terminal electrode 26 cover the ridge where the first and fourth side faces 22a, 22d meet. The electrode parts 28a, 28b of the second terminal electrode 28 cover the ridge where the second and third side faces 22b, 22c meet. The electrode parts 30a, 30b of the second terminal electrode 30 cover the ridge where the second and fourth side faces 22b, 22d meet.

The electrode part 24c of the first terminal electrode 24 is continuous with the electrode parts 24a, 24b. The electrode part 26c of the first terminal electrode 26 is continuous with the electrode parts 26a, 26b. The electrode part 28c of the second terminal electrode 28 is continuous with the electrode parts 28a, 28b. The electrode part 30c of the second terminal electrode 30 is continuous with the electrode parts 30a, 30b. The electrode parts 24c, 26c, 28c, 30c are positioned on the fifth side face 22e of the capacitor element 22.

As shown in FIG. 4(a), when seen in the arrowed direction A, the capacitor element 22 has an area A5 held between the electrode part 24a of the first terminal electrode 24 and the electrode part 28a of the second terminal electrode 28. The capacitor element 22 has an area A6 held between the electrode part 26a of the first terminal electrode 26 and the electrode part 30a of the second terminal electrode 30. The capacitor element 22 has an area A7 held between the electrode part 24b of the first terminal electrode 24 and the electrode part 26b of the first terminal electrode 26. The capacitor element 22 has an area A8 held between the electrode part 28b of the second terminal electrode 28 and the electrode part 30b of the second terminal electrode 30. Since the electrode parts 24a, 24b, 26a, 26b, 28a, 28b, 30a, 30b are arranged at the positions mentioned above, the areas A5 to A8 are positioned so as to surround the main electrode parts 32, 37 of the inner electrodes E3, E4 without overlapping the main electrode parts 32, 37.

When a voltage is applied to the inner electrodes E3, E4 through the first terminal electrodes 24, 26 and second terminal electrodes 28, 30 in thus constructed multilayer capacitor C2, the electrostrictive effect occurs in the element part 41 held between the main electrode part 32 of the inner electrode E3 and the main electrode part 37 of the inner electrode E4. While thus generated electrostrictive effect expands and contracts the main electrode parts 32, 37 of the inner electrodes E3, E4, mechanical strains of the capacitor element 22 caused by the expansion and contraction are alleviated in the areas A5 to A8 not overlapping the main electrode parts 32, 37 and element part 41. As a result, the phenomenon that the first terminal electrodes 24, 26 and second terminal electrodes 28, 30 are pulled by mechanical strains of the capacitor element 22 is hard to occur.

Therefore, even when the multilayer capacitor C2 is mounted to a board or the like and a voltage is applied to the first terminal electrodes 24, 26 and second terminal electrodes 28, 30, sounding is restrained from occurring in the board or the like as in the multilayer capacitor C1 in accordance with the first embodiment.

Since the four terminal electrodes 24, 26, 28, 30 are placed at four ridges of the capacitor element 22, the terminal electrodes exist on all of the first to fourth side faces 22a to 22d. This makes it easy to connect the multilayer capacitor C2 to land electrodes of a board.

Third Embodiment

With reference to FIGS. 5 and 6, the multilayer capacitor in accordance with the third embodiment will be explained. The multilayer capacitor in accordance with the third embodiment differs from the multilayer capacitors C1, C2 in accordance with the first and second embodiments in terms of positions of terminal electrodes. FIG. 5 is a view showing the multilayer capacitor in accordance with this embodiment, in which FIGS. 5(a) and 5(b) are perspective and top plan views.

The multilayer capacitor C3 in accordance with the third embodiment comprises a capacitor element 22, inner electrodes E3, E4, first terminal electrodes 44, 46, 52, 56, and second terminal electrodes 48, 50, 54, 58. The capacitor element 22 and inner electrodes E3, E4 have structures similar to those of the capacitor element 22 and inner electrodes E3, E4 of the capacitor element 2 in accordance with the second embodiment.

On the capacitor element 2, the first terminal electrodes 44, 46 are arranged over the first, fifth, and sixth side faces 22a, 22e, 22f. The first terminal electrode 54 is arranged over the third, fifth, and sixth side faces 22c, 22e, 22f. The first terminal electrode 56 is arranged over the fourth, fifth, and sixth side faces 22d, 22e, 22f. The second terminal electrodes 48, 50 are arranged over the second, fifth, and sixth side faces 22b, 22e, 22f. The second terminal electrode 58 is arranged over the third, fifth, and sixth side faces 22c, 22e, 22f. The second terminal electrode 60 is arranged over the fourth, fifth, and sixth side faces 22d, 22e, 22f. The first terminal electrodes 44, 46, 54, 56 and second terminal electrodes 48, 50, 58, 60 have electrode parts 44a, 46a, 54a, 56a, 48a, 50a, 58a, 60a. Materials and methods for forming the first terminal electrodes 44, 46, 54, 56 and second terminal electrodes 48, 50, 58, 60 are similar to those of the first terminal electrodes 4, 6 and second terminal electrodes 8, 10 in accordance with the first embodiment.

The electrode parts 44a, 46a of the first terminal electrodes 44, 46 are positioned on the first side face 22a. When seen in the arrowed direction B, the electrode parts 44a, 46a of the first terminal electrodes 44, 46 are arranged on the first side face 22a in any of a plurality of areas holding the element part 41 therebetween in the arrowed direction C and not overlapping the element part 41 as with the electrode parts 24a, 26a of the multilayer capacitor C2 in accordance with the second embodiment. In this embodiment, in two areas holding the element part 41 therebetween in the arrowed direction C and not overlapping the element part 41, the electrode part 44a is arranged in the area on the third side face 22c side, while the electrode part 46a is arranged in the area on the fourth side face 22d side.

The electrode parts 48a, 50a of the second terminal electrodes 48, 50 are positioned on the second side face 22b. The electrode part 48a of the second terminal electrode 48 is arranged so as to oppose the electrode part 44a of the first terminal electrode 44. The electrode part 50a of the second terminal electrode 50 is arranged so as to oppose the electrode part 46a of the first terminal electrode 46.

The electrode part 54a of the first terminal electrode 54 is positioned on the third side face 22c. The electrode part 56a of the first terminal electrode 56 is positioned on the fourth side face 22d. The electrode part 58a of the second terminal electrode 58 is positioned on the third side face 22c. The electrode part 60a of the second terminal electrode 60 is positioned on the fourth side face 22d. When seen in the arrowed direction C, the electrode parts 54a, 58a are arranged on the third side face 22c in any of a plurality of areas holding the element part 41 therebetween in the arrowed direction B and not overlapping the element part 41 as with the electrode parts 24b, 28b of the multilayer capacitor C2 in accordance with the second embodiment. In this embodiment, in two areas holding the element part 41 therebetween in the arrowed direction B and not overlapping the element part 41, the electrode part 54*a* is arranged in the area on the first side face 22*a* side, while the electrode part 58*a* is arranged in the area on the second side face 22*b* side. On the fourth side face 22*d*, the electrode part 56*a* of the first terminal electrode 56 is positioned so as to oppose the electrode part 54*a* of the first terminal electrode 54. On the fourth side face 22*d*, the electrode part 60*a* of the second terminal electrode 60 is positioned so as to oppose the electrode part 58*a* of the second terminal electrode 58.

As shown in FIG. 5(*b*), when seen in the arrowed direction A, the capacitor element 22 has an area A9 held between the electrode part 44*a* of the first terminal electrode 44 and the electrode part 48*a* of the second terminal electrode 48. The capacitor element 22 has an area A10 held between the electrode part 46*a* of the first terminal electrode 46 and the electrode part 50*a* of the second terminal electrode 50. The capacitor element 22 has an area A11 held between the electrode part 54*a* of the first terminal electrode 54 and the electrode part 56*a* of the first terminal electrode 56. The capacitor element 22 has an area A12 held between the electrode part 58*a* of the second terminal electrode 58 and the electrode part 60*a* of the second terminal electrode 60. Since the electrode parts 44*a*, 46*a*, 54*a*, 56*a*, 48*a*, 50*a*, 58*a*, 60*a* are arranged at the positions mentioned above, the areas A9 to A12 are positioned so as to surround the main electrode parts 32, 37 without overlapping the main electrode parts 32, 37.

When a voltage is applied to the inner electrodes E3, E4 through the first terminal electrodes 44, 46, 54, 56 and second terminal electrodes 48, 50, 58, 60 in thus constructed multilayer capacitor C3, the electrostrictive effect occurs in the element part 41. While thus generated electrostrictive effect expands and contracts the main electrode parts 32, 37 of the inner electrodes E3, E4, mechanical strains of the capacitor element 22 caused by the expansion and contraction are alleviated in the areas A9 to A12 not overlapping the main electrode parts 32, 37 and element part 41. Therefore, even when the multilayer capacitor C3 is mounted to a board or the like, sounding is restrained from occurring in the board or the like as in the multilayer capacitors C1, C2 in accordance with the first and second embodiments. Also, the multilayer capacitor C3 has the electrode parts on the first to fourth side faces 22*a* to 22*f* and thus is easy to connect with land electrodes of the board.

Though preferred embodiments of the present invention are explained in the foregoing, the present invention is not necessarily limited to the above-mentioned embodiments and can be modified in various ways within the scope not deviating from the gist thereof.

For example, the number of laminations of inner electrodes and numbers of first and second terminal electrodes are not limited to those shown in the above-mentioned embodiments. The terminal electrodes may have an L- or I-shaped cross section. For example, the first terminal electrodes 4, 6 and second terminal electrodes 8, 10 in the first embodiment may lack the electrode parts 4*b*, 6*b*, 8*b*, 10*b*.

Though the areas A1 to A4 do not overlap the main electrode parts 12, 17 and element part 21 in the first embodiment, it will be sufficient if at least one of the A1 to A4 is kept from overlapping the main electrode parts 12, 17 and element part 21. FIG. 6 is a sectional view showing a modified example of the multilayer capacitor C1. In this multilayer capacitor, the areas A3, A4 overlap the main electrode parts 12, 17 of the inner electrodes E1, E2, whereas the areas A1, A2 do not overlap the main electrode parts 12, 17 and element part 21. This can restrain the first terminal electrodes 4, 6 and second terminal electrodes 8, 10 from being pulled by mechanical strains of the capacitor element 2. For more reliably inhibiting the first terminal electrodes 4, 6 and second terminal electrodes 8, 10 from being pulled, however, it will be desirable if all of the areas A1 to A4 overlap none of the main electrode parts 12, 17 and the element part 21.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor comprising:
   an element body made of a dielectric material;
   a plurality of inner electrodes arranged within the element body such as to oppose each other at least partly; and
   a plurality of terminal electrodes arranged on the element body and connected to corresponding inner electrodes in the plurality of inner electrodes;
   wherein the plurality of terminal electrodes include respective electrode parts arranged in any of a plurality of areas on two side faces opposing each other and being parallel to a first direction in which the plurality of inner electrodes oppose each other in outer surfaces of the element body, the plurality of areas, when seen in a second direction in which the two side faces oppose each other, holding therebetween an element part held between the plurality of inner electrodes in a third direction orthogonal to the first and second directions and being kept from overlapping the element part.

2. A multilayer capacitor according to claim 1, wherein the plurality of terminal electrodes further include respective additional electrode parts continuous with the electrode parts and arranged in any of a plurality of areas on two side faces opposing each other in the third direction in the outer surfaces of the element body, the plurality of areas, when seen in the third direction, holding therebetween the element part in the second direction and being kept from overlapping the element part.

3. A multilayer capacitor according to claim 1, wherein the plurality of terminal electrodes further include respective additional electrode parts continuous with the electrode parts and arranged on a side face orthogonal to the first direction in the outer surfaces of the element body.

4. A multilayer capacitor according to claim 2, wherein the plurality of terminal electrodes further include respective additional electrode parts continuous with the electrode parts and arranged on a side face orthogonal to the first direction in the outer surfaces of the element body.

5. A multilayer capacitor comprising:
   an element body made of a dielectric material;
   a plurality of inner electrodes arranged within the element body such as to oppose each other at least partly; and
   a plurality of terminal electrodes arranged on the element body and connected to corresponding inner electrodes in the plurality of inner electrodes;
   wherein the plurality of terminal electrodes include respective electrode parts arranged in any of a plurality of first areas on two side faces opposing each other and being parallel to a first direction in which the plurality of inner electrodes oppose each other in outer surfaces of the element body, the plurality of first areas, when seen in a second direction in which the two side faces oppose each other, holding therebetween an element part held between the plurality of inner electrodes in a third direction orthogonal to the first and second directions and being kept from overlapping the element part, and a plurality of second areas on two side faces opposing each other in the third direction in the outer surfaces of the element body, the plurality of second areas, when seen in the third direction, holding therebetween the element part in the second direction and being kept from overlapping the element part.

* * * * *